(12) United States Patent
Fraidlin et al.

(10) Patent No.: US 6,194,880 B1
(45) Date of Patent: Feb. 27, 2001

(54) BOOST CONVERTER, METHOD OF CONVERTING POWER AND POWER SUPPLY EMPLOYING THE SAME

(75) Inventors: Simon Fraidlin, Plano, TX (US); Andrey Frolov, Moscow (RU); Anatoliy Polikarpov, Mesquite, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/426,230

(22) Filed: Oct. 22, 1999

(51) Int. Cl.[7] ................. G05F 1/10; G05F 1/40
(52) U.S. Cl. ........................... 323/222; 323/282
(58) Field of Search .................. 323/222, 224, 323/282, 283, 284, 285

(56) References Cited

U.S. PATENT DOCUMENTS

| | | | |
|---|---|---|---|
| 4,347,474 | * 8/1982 | Brooks et al. | 323/224 |
| 4,672,303 | * 6/1987 | Newton | 323/285 |
| 4,801,859 | * 1/1989 | Dishner | 323/224 |
| 5,233,287 | * 8/1993 | Lenk | 323/268 |
| 5,479,089 | * 12/1995 | Lee | 323/283 |
| 5,552,694 | * 9/1996 | Appeltans | 323/222 |
| 5,574,357 | * 11/1996 | Otake et al. | 323/222 |
| 5,726,845 | * 3/1998 | Ho | 361/86 |

* cited by examiner

Primary Examiner—Adolf Deneke Berhane

(57) ABSTRACT

A boost converter, a method of converting power and a power supply incorporating the boost converter or the method. In one embodiment, the boost converter has an input couplable to a source of electrical power and includes: (1) a boost inductor coupled to the input and adapted to conduct currents bidirectionally, (2) a first controllable switch coupled to the boost inductor, (3) a second controllable switch coupled to a node between the first controllable switch and the boost inductor and (4) a controller, coupled to the first and second controllable switches, that closes the first controllable switch to provide a charging conductive path across the input to charge the boost inductor and alternately closes the second controllable switch to provide: (4a) a forward conductive path from the boost inductor to an output of the boost converter when a voltage at the node exceeds a voltage at the output to provide power to the output and (4b) a reverse conductive path from the output to the boost inductor when the voltage at the output exceeds the voltage at the node to decrease the voltage at the node and thereby decrease a switching voltage of the first controllable switch.

24 Claims, 3 Drawing Sheets

BOOST CONVERTER, METHOD OF CONVERTING POWER AND POWER SUPPLY EMPLOYING THE SAME

TECHNICAL FIELD OF THE INVENTION

The present invention is directed, in general, to power conversion and, more specifically, to a boost converter employing controllable switches and a method of converting power to increase an efficiency of the boost converter.

BACKGROUND OF THE INVENTION

A power converter is a power processing circuit that converts an input voltage or current source waveform into a specified output voltage or current waveform. A switched-mode power converter is a frequently employed power converter that converts an input voltage waveform into a specified output voltage waveform. A boost converter is one example of a switched-mode power converter that is typically employed in off-line applications wherein power factor correction, total harmonic distortion (THD) reduction and a stable, regulated voltage are desired at the output of the power converter. The boost converter may also be employed in DC-DC applications, such as portable and stationary digital signal processors and telecommunications equipment.

A non-isolated boost converter generally includes a boost inductor and power switch coupled across an input of the boost converter. The boost converter further includes a rectifying diode coupled to a node between the boost inductor and the power switch. The boost converter still further includes an output capacitor coupled across an output of the boost converter. The output capacitor is usually large to ensure a constant output voltage. A load is then connected in parallel across the output capacitor. The output voltage (measured at the load) of the boost converter is always greater than the input voltage.

The boost converter generally operates as follows. The power switch is closed for a first interval D. The rectifying diode is reverse-biased, isolating the output capacitor and, therefore, the load from the input of the boost converter. During this interval, the input voltage supplies energy to charge the boost inductor and the inductor current increases. Since the load is isolated from the input voltage, a stored charge in the output capacitor powers the load. Then, for a second interval 1-D, the power switch is opened. The inductor current decreases as energy from both the boost inductor and the input flows forward through the rectifying diode to charge the output capacitor and power the load. By varying a duty cycle of the power switch, the output voltage of the boost converter may be controlled.

The boost converter may be operated in three modes: continuous conduction mode (CCM), discontinuous conduction mode (DCM) or critical mode (CM). The modes are defined by characteristics of the inductor current. More specifically, in CCM, the inductor current is unidirectional and is always greater than zero. In DCM, the inductor current is unidirectional and is equal to zero for a period of time during each switching cycle. In CM, the inductor current is unidirectional and reaches zero only for an instant during each switching cycle.

Analogous to other types of power converters, the boost converter is subject to inefficiencies that impairs its overall performance. More specifically, the power switch and rectifying diode may be subject to conduction losses that reduce the efficiency of the boost converter. Additionally, the power switch [e.g., a metal-oxide semiconductor field-effect transistor (MOSFET)] is subject to switching losses that occur when a charge built-up in a parasitic capacitance of the power switch is dissipated during turn-on. Furthermore, if the boost converter is operated in CCM, the rectifying diode is also subject to a reverse recovery condition during a turn-on interval of the power switch that induces a substantial current spike through the power switch and the rectifying diode. The losses associated with the power switch and rectifying diode increase linearly as the switching frequency of the boost converter increases. Therefore, minimizing the losses associated with the boost converter and, more specifically, the reverse recovery and switching losses associated with the rectifying diode and power switch will improve the overall efficiency of the boost converter.

The losses associated with reverse recovery of the rectifying diode may be reduced by introducing an ancillary circuit coupled to the rectifying diode and the power switch. One example of an ancillary circuit includes a series-coupled ancillary inductor and ancillary switch, coupled across the power switch, that provides a discharge path for the inductor current. The ancillary switch is closed a short time before the turn-on of the power switch to divert the rectifying diode reverse recovery current and the inductor current into the ancillary inductor. Since the ancillary circuit is coupled across the power switch, the ancillary circuit also discharges the parasitic capacitance of the power switch, thereby allowing the power switch to be turned on with substantially zero volts thereacross. Once the power switch is closed, the energy stored in the ancillary inductor may be recovered into the output capacitor by other components of the ancillary circuit.

While the ancillary circuit described may reduce losses in the rectifying diode and the power switch, the addition of the ancillary circuit increases both the complexity and cost of the boost converter. Furthermore, the components of the ancillary circuit are subject to the same current and voltage stresses as the main circuit components during at least part of the switching cycle. Moreover, the components of the ancillary circuit are also subject to switching and conduction losses. Although the ancillary circuit allows the power switch to operate with substantially zero voltage switching (ZVS), the ancillary switch is hard switched.

Accordingly, what is needed in the art is a boost converter topology that overcomes the deficiencies of the prior art.

SUMMARY OF THE INVENTION

To address the above-discussed deficiencies of the prior art, the present invention provides a boost converter, a method of converting power and a power supply incorporating the boost converter or the method. In one embodiment, the boost converter has an input couplable to a source of electrical power and includes: (1) a boost inductor coupled to the input and adapted to conduct current bidirectionally, (2) a first controllable switch coupled to the boost inductor, (3) a second controllable switch coupled to a node between the first controllable switch and the boost inductor and (4) a controller, coupled to the first and second controllable switches, that closes the first controllable switch to provide a charging conductive path across the input to charge the boost inductor and alternately closes the second controllable switch to provide: (4a) a forward conductive path from the boost inductor to an output of the boost converter when a voltage at the node exceeds a voltage at the output to provide power to the output and (4b) a reverse conductive path from the output to the boost inductor when the voltage at the output exceeds the voltage at the node to decrease the voltage at the node and thereby decrease a switching voltage of the first controllable switch.

The present invention therefore introduces the broad concept of employing a controllable switch instead of a rectifying diode in a boost converter topology to enable bidirectional flow within the boost converter. This bidirectional current flow is advantageously employed to decrease the voltage drop across the first and second controllable switches before the switches are closed, thereby decreasing switching stresses and losses and increasing the overall efficiency of the boost converter.

In one embodiment of the present invention, the boost converter further includes an output capacitor, coupled across the output, that maintains the voltage at the output at a substantially constant level. Those skilled in the art are familiar with output capacitors and their use in power conversion.

In one embodiment of the present invention, the controller introduces a delay period between closing the first controllable switch and closing the second controllable switch. In an embodiment to be illustrated and described, two delay periods are introduced: a first delay period between turn-off (closing) of the first controllable switch and turn-on (opening) of the second controllable switch and a second delay period between turn-off of the second controllable switch and turn-on of the first controllable switch.

In one embodiment of the present invention, an input voltage of the boost converter is unipolar. This unipolar voltage may be produced by, for example, a rectifier.

In one embodiment of the present invention, the first and second controllable switches are metal-oxide semiconductor field-effect transistors (MOSFETs). Those skilled in the art are familiar with other conventional controllable switches that may be employed to advantage in the topology of the present invention. The present invention encompasses all conventional and later-discovered controllable switches.

In one embodiment of the present invention, the controller closes the first and second controllable switches based on a characteristic of the boost converter. The characteristic may be, for example, an output voltage or an input current. Of course, the boost converter may be controlled based on other characteristics derived from other locations in the boost converter, or may be open-loop controlled.

In one embodiment of the present invention, an input voltage of the boost converter is between about 85 and about 265 volts. Of course, other given input voltages are within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
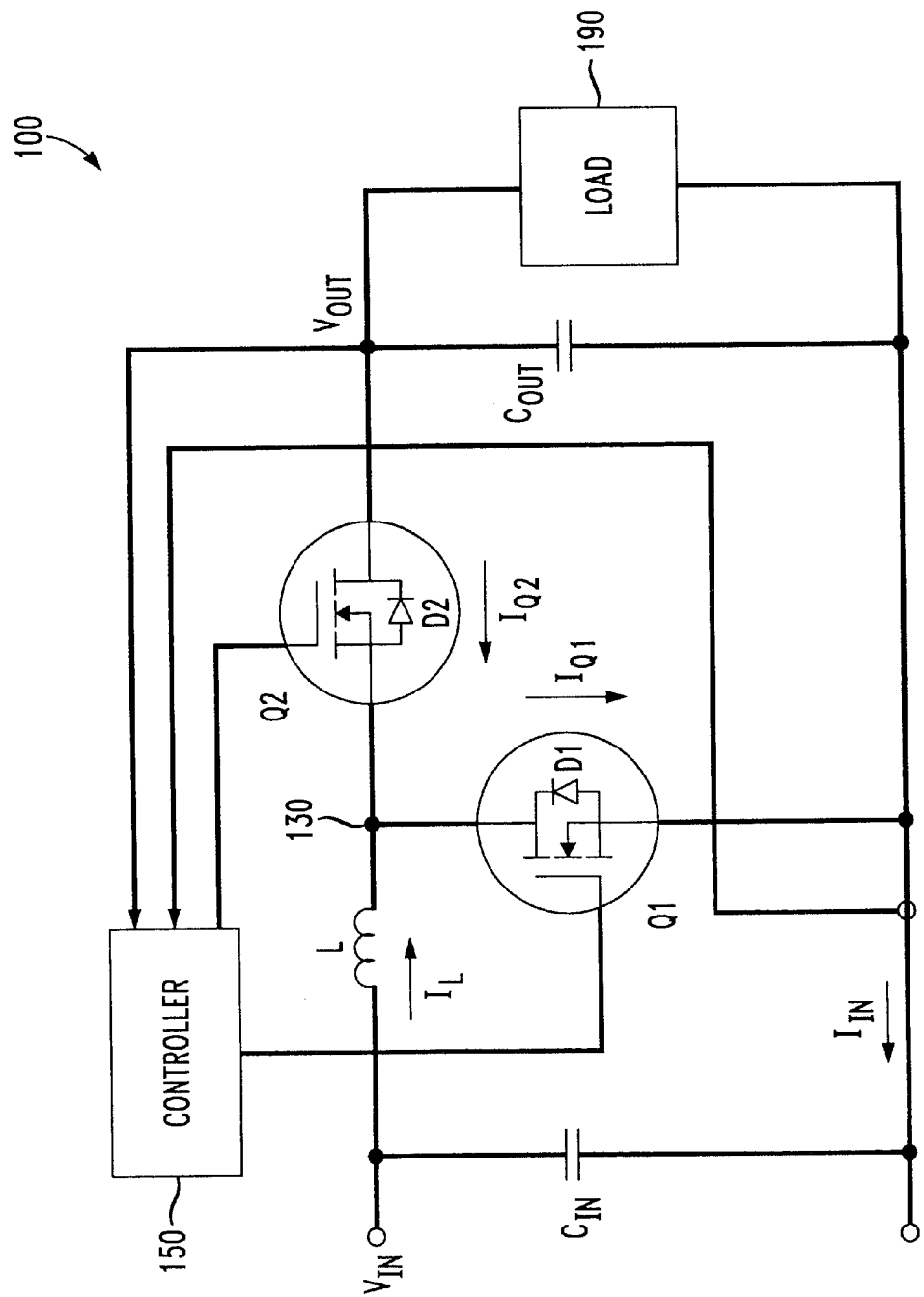
FIG. 1 illustrates a schematic diagram of an embodiment of a boost converter constructed in accordance with the principles of the present invention.

Referring initially to FIG. 1, illustrated is a schematic diagram of an embodiment of a boost converter 100 constructed in accordance with the principles of the present invention. The boost converter 100 has an input couplable to a source of electrical power (having an input voltage $V_{IN}$) and an output couplable to a load 190. The boost converter 100 includes an input capacitor $C_{IN}$ coupled across the input. The boost converter 100 further includes a boost inductor L coupled to the input capacitor $C_{IN}$. The boost converter 100 further includes a first controllable switch Q1 coupled to the boost inductor L. The boost converter 100 further includes a second controllable switch Q2 coupled to a node 130 between the first controllable switch Q1 and the boost inductor L. In the illustrated embodiment, the first and second controllable switches Q1, Q2 are metal-oxide semiconductor field-effect transistors (MOSFETs) having first and second body diodes D1, D2, respectively. Those skilled in the art are familiar with conventional controllable switches such as MOSFETs. Of course, the present invention encompasses all conventional and later-discovered controllable switches.

The boost converter 100 further includes an output capacitor $C_{OUT}$ coupled across the output. The capacitor is preferably large to maintain the output voltage $V_{OUT}$ at a substantially constant level. The boost converter 100 still further includes a controller 150, coupled to the first and second controllable switches Q1, Q2, that monitors a characteristic of the boost converter 100. In the illustrated embodiment, the controller 150 monitors both an output voltage $V_{OUT}$ and an input current $I_{IN}$ of the boost converter 100 and adjusts the switching cycles of the first and second controllable switches Q1, Q2 to thereby regulate the output voltage $V_{OUT}$ of the boost converter 100.

The boost converter 100 operates as follows. The controller 150 closes the first controllable switch Q1 for a primary interval D to provide a charging conductive path across the input to charge the boost inductor L. During the primary interval D, the input voltage $V_{IN}$ supplies energy to charge the boost inductor L and an inductor current $I_L$ increases. The second controllable switch Q2 is not conducting, decoupling the load 190 from the input voltage $V_{IN}$. A stored charge in the output capacitor $C_{OUT}$, therefore, powers the load 190 during the primary interval D.

The controller 150 then opens the first controllable switch Q1 at the end of the primary interval D. The inductor current $I_L$, which was flowing through the first controllable switch Q1, now charges the parasitic capacitance of the first controllable switch Q1. As the parasitic capacitance charges, a voltage across the first controllable switch Q1 increases until a voltage at the node 130 exceeds the output voltage $V_{OUT}$. The second body diode D2 of the second controllable switch Q2 now conducts, allowing the controller 150 to close the second controllable switch Q2 with substantially zero volts thereacross to start the complementary interval 1-D. The controller 150 thus provides a forward conductive path from the boost inductor to the output of the boost converter 100.

The inductor current $I_L$ now flows through the second controllable switch Q2 to charge the output capacitor $C_{OUT}$ and to power the load 190. As energy is removed from the boost inductor L, the inductor current $I_L$ steadily decreases. Once a substantial portion of the energy has been removed from the boost inductor L such that the voltage at the output exceeds the voltage at the node 130, the inductor current $I_L$ will reverse direction, flowing back into the source of electrical power. By closing the second controllable switch Q2, the controller 150 thus provides a reverse conductive path from the output to the boost inductor L.

The controller 150 then opens the second controllable switch Q2 at the end of the complementary interval 1-D. The inductor current $I_L$ continues to flow back into the source of electrical power, drawing charge out of the parasitic capacitance of the first controllable switch Q1. The voltage at the node 130 now decreases to about common, allowing the controller 150 to close the first controllable switch Q1 with substantially zero volts thereacross to repeat the primary interval D. Once a substantial portion of the energy has been removed from the parasitic capacitance of the first controllable switch Q1, the inductor current $I_L$ will again reverse direction to provide a charging conductive path across the input to charge the boost inductor L.

By employing a controllable switch (the second controllable switch Q2) instead of a rectifying diode, the boost converter topology of the present invention is capable of operating in trans-critical conduction mode wherein the inductor current $I_L$ is bidirectional. This bidirectional flow of the inductor current $I_L$ is advantageously employed to decrease the voltage drop across the first and second controllable switches Q1, Q2 before the first and second controllable switches Q1, Q2 are closed, thereby decreasing switching stresses and losses and increasing the overall efficiency of the boost converter 100. Further, losses due to reverse recovery of the rectifying diode employed in the conventional boost converter may also be avoided.

While the input capacitor $C_{IN}$ reduces a high frequency ripple at the input of the boost converter 100, the effectiveness of the input capacitor $C_{IN}$ may be improved by employing magnetically coupled filtering.

Figure 2:
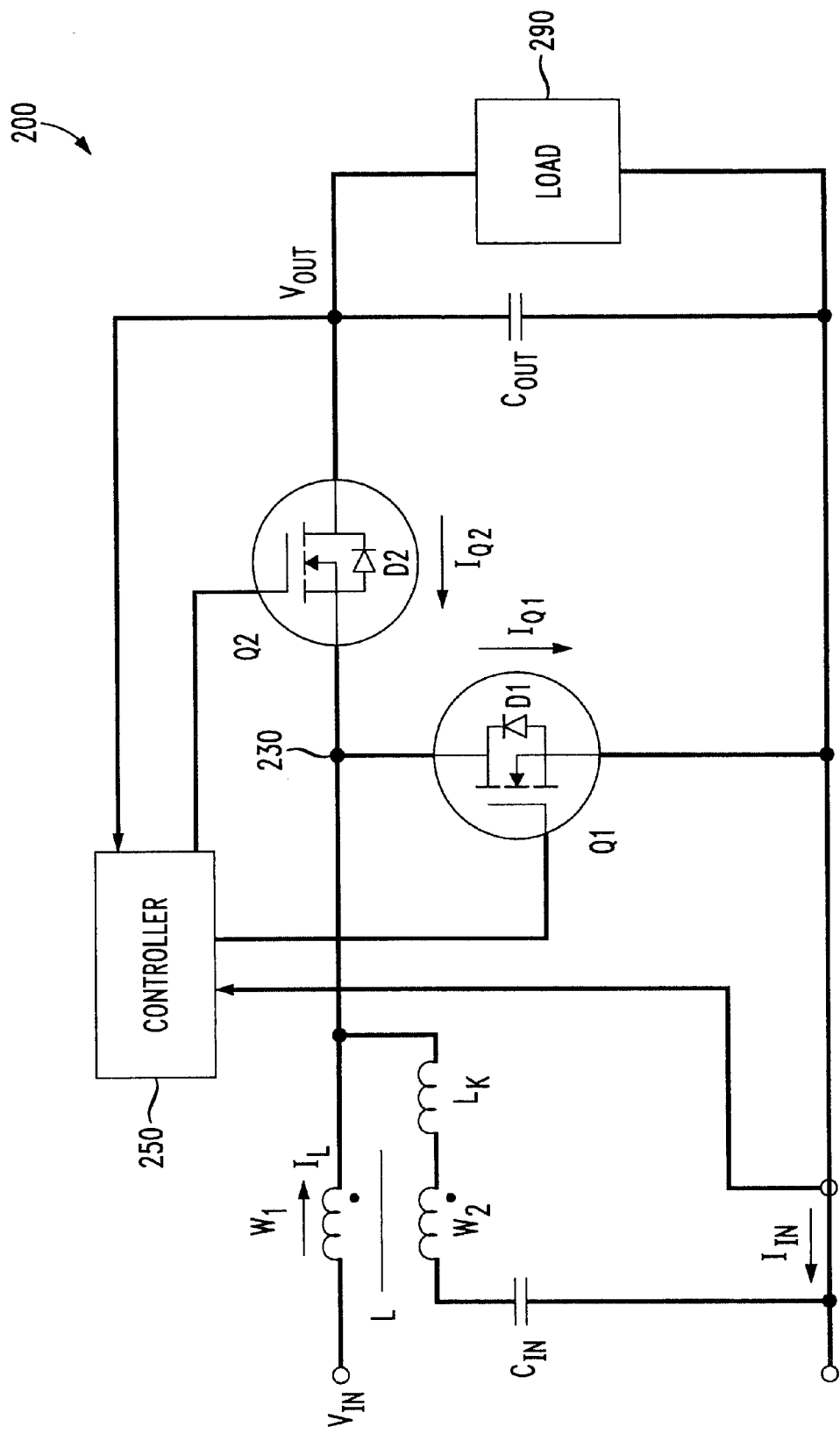
FIG. 2 illustrates a schematic diagram of another embodiment of a boost converter constructed in accordance with the principles of the present invention.

Turning now to FIG. 2, illustrated is a schematic diagram of another embodiment of a boost converter 200 constructed in accordance with the principles of the present invention. The boost converter 200 is similar to the boost converter 100 of FIG. 1 but employs magnetically coupled filtering to more effectively suppress the high frequency ripple at the input of the boost converter 200.

The boost converter 200 has an input couplable to a source of electrical power (having an input voltage $V_{IN}$) and an output couplable to a load 290. The boost converter 200 includes a boost inductor L, having first and second magnetically coupled windings W1, W2, coupled to the input. In the illustrated embodiment, the boost inductor L further has a leakage inductance $L_K$. Those skilled in the art will understand that the leakage inductance $L_K$ may be supplemented with an ancillary inductor as needed. The boost converter 200 further includes an input capacitor $C_{IN}$ coupled to the second winding W2 of the boost inductor L. The second winding W2 and the input capacitor $C_{IN}$ thus cooperate to form a magnetically coupled filter that may more effectively suppress the high frequency ripple. Those skilled in the art are familiar with the use of magnetically coupled filtering in reducing high frequency ripple.

The boost converter 200 further includes a first controllable switch Q1 coupled to the boost inductor L. The boost converter 200 further includes a second controllable switch Q2 coupled to a node 230 between the first controllable switch Q1 and the boost inductor L. The boost converter 200 further includes an output capacitor $C_{OUT}$ coupled across the output. The boost converter 200 still further includes a controller 250, coupled to the first and second controllable switches Q1, Q2, that monitors a characteristic of the boost converter 200. In the illustrated embodiment, the controller 250 monitors both an output voltage $V_{OUT}$ and an input current $I_{IN}$ of the boost converter 200 and adjusts the switching cycles of the first and second controllable switches Q1, Q2 to thereby regulate the output voltage $V_{OUT}$ of the boost converter 200.

The operation of the boost converter 200 is analogous to the operation of the boost converter 100 of FIG. 1 and, therefore, will not be discussed.

Figure 3:
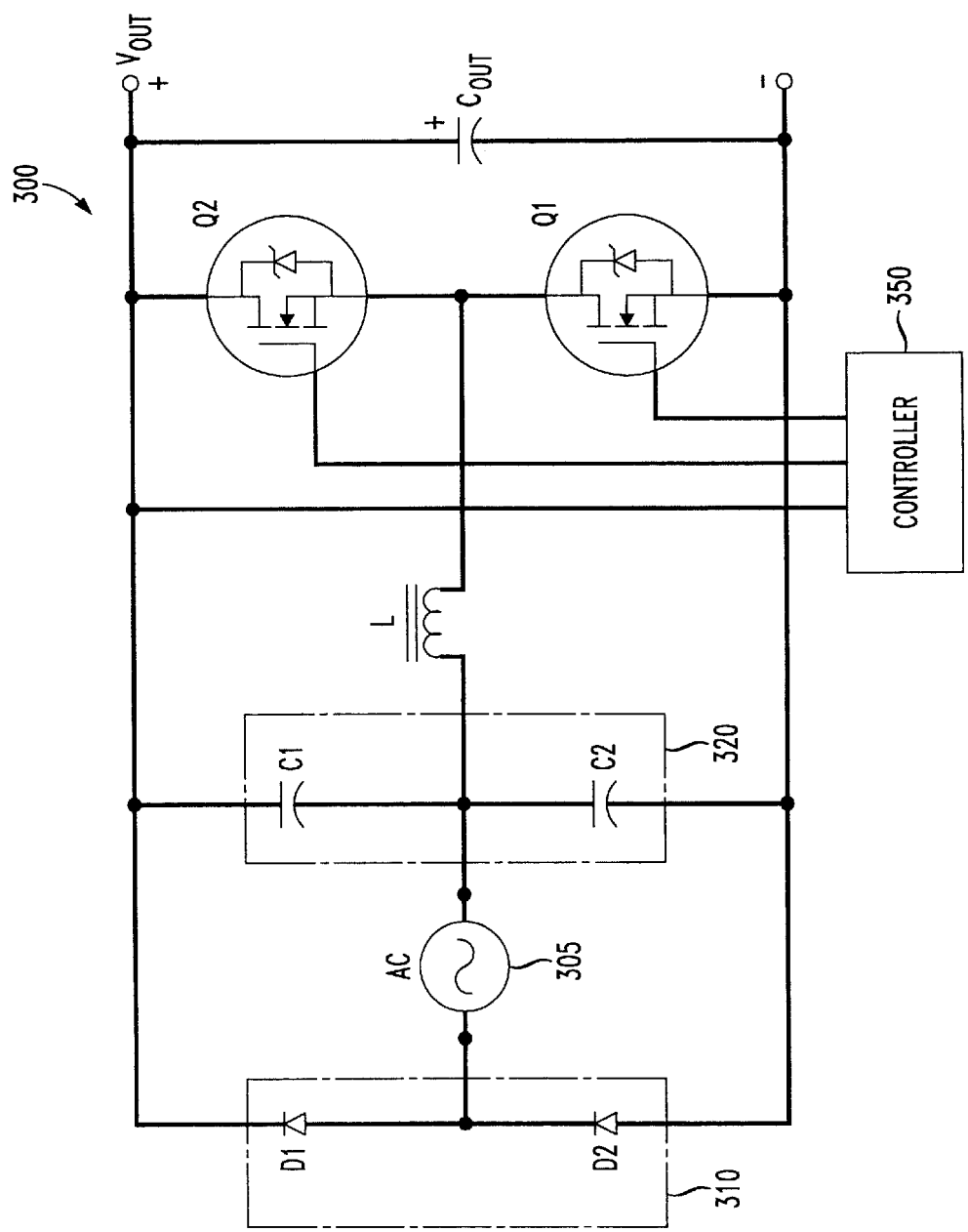
FIG. 3 illustrates a schematic diagram of an embodiment of a power supply constructed in accordance with the principles of the present invention.

Turning now to FIG. 3, illustrated is a schematic diagram of an embodiment of a power supply 300 constructed in accordance with the principles of the present invention. The power supply 300 has an input coupled to a source of AC power 305. In the illustrated embodiment, the power supply 300 is a power factor corrector (PFC) employable in off-line applications.

The power supply 300 includes a rectifier circuit 310, having first and second rectifying diodes D1, D2, that converts input AC power into power of a given voltage. The power supply 300 further includes a filter circuit 320 coupled to the output of the rectifier circuit 310. In the illustrated embodiment, the filter circuit 320 has first and second high frequency capacitors C1, C2. The power supply 300 still further includes a boost converter, having a boost inductor L and first and second controllable switches Q1, Q2, coupled to the rectifier and filter circuits 310, 320.

While conventional PFC circuits may require a full bridge rectifier circuit having four rectifying diodes, the power supply 300 of the present invention advantageously operates the first and second controllable switches Q1, Q2 symmetrically, enabling the power supply 300 to employ a rectifier circuit 310 having only two rectifying diodes. Reducing the number of rectifying diodes may substantially reduce the voltage and power losses associated therewith, thereby increasing an efficiency of the power supply 300. Those skilled in the art will realize, of course, that the a magnetically coupled filter described with respect to the power converter 200 of FIG. 2 may also be employed to advantage with the power supply 300.

Those skilled in the art should understand that the previously described embodiments of the boost converter and power supply are submitted for illustrative purposes only and other embodiments of the boost converter employing a controllable switch instead of a rectifying diode to enable bidirectional flow within the boost converter are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

For a better understanding of power converters, see *Modern DC-to-DC Switchmode Power Converter Circuits*, by Rudolph P. Severns and Gordon Bloom, Van Nostrand Reinhold Company, New York, N.Y. (1985); and *Principles of Power Electronics*, by John G. Kassakian, Martin F. Schlect and George C. Verghese, Addison-Wesley Publishing Company, Reading, Mass. (1991). The above-listed references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. A boost converter having an input couplable to a source of electrical power, comprising:
   a boost inductor coupled to said input and adapted to conduct currents bidirectionally;
   a first controllable switch coupled to said boost inductor;
   a second controllable switch coupled to a node between said first controllable switch and said boost inductor; and
   a controller, coupled to said first and second controllable switches, that closes said first controllable switch to provide a charging conductive path across said input to charge said boost inductor and alternately closes said second controllable switch to provide:
      a forward conductive path from said boost inductor to an output of said boost converter when a voltage at said node exceeds a voltage at said output to provide power to said output, and
      a reverse conductive path from said output to said boost inductor when said voltage at said output exceeds said voltage at said node to decrease said voltage at said node and thereby decrease a switching voltage of said first controllable switch.

2. The boost converter as recited in claim 1 further comprising an output capacitor, coupled across said output, that maintains said voltage at said output at a substantially constant level.

3. The boost converter as recited in claim 1 wherein said controller introduces a delay period between closing said first controllable switch and closing said second controllable switch.

4. The boost converter as recited in claim 1 wherein an input voltage of said boost converter is unipolar.

5. The boost converter as recited in claim 1 wherein said first and second controllable switches are metal-oxide semiconductor field-effect transistors (MOSFETs).

6. The boost converter as recited in claim 1 wherein said controller closes said first and second controllable switches based on a characteristic of said boost converter.

7. The boost converter as recited in claim 1 wherein an input voltage of said boost converter is between about 85 and about 265 volts.

8. A method of converting power in a boost converter, comprising:
   establishing a charging conductive path to charge a boost inductor by closing a controllable switch coupled to said boost inductor; and
   alternately establishing a bidirectional conductive path between said boost inductor and an output of said boost converter to provide power to said output and decrease a switching voltage of said controllable switch.

9. The method as recited in claim 8 further comprising maintaining a voltage at said output at a substantially constant level.

10. The method as recited in claim 8 further comprising introducing a delay period between said closing and said alternately closing.

11. The method as recited in claim 8 wherein an input voltage of said boost converter is unipolar.

12. The method as recited in claim 8 wherein said alternately establishing is carried out by closing a second controllable switch.

13. The method as recited in claim 8 wherein said establishing and said alternately establishing are carried out based on a characteristic of said boost converter.

14. The method as recited in claim 8 wherein an input voltage of said boost converter is between about 85 and about 265 volts.

15. A power supply, comprising:
   a rectifier adapted to receive input AC power; and
   a boost converter having an input coupled to said rectifier and including:
      a boost inductor coupled to said input and adapted to conduct currents bidirectionally,
      a first controllable switch coupled to said boost inductor,
      a second controllable switch coupled to a node between said first switch and said boost inductor, and
      a controller, coupled to said first and second controllable switches, that closes said first controllable switch to provide a charging conductive path across said input to charge said boost inductor and alternately closes said second controllable switch to provide:
         a forward conductive path from said boost inductor to an output of said boost converter when a voltage at said node exceeds a voltage at said output to provide power to said output, and
         a reverse conductive path from said output to said boost inductor when said voltage at said output exceeds said voltage at said node to decrease said voltage at said node and thereby decrease a switching voltage of said first controllable switch.

16. The power supply as recited in claim 15 wherein said boost converter further includes an output capacitor coupled across said output, that maintains said voltage at said output at a substantially constant level.

17. The power supply as recited in claim 15 wherein said controller introduces a delay period between closing said first controllable switch and closing said second controllable switch.

18. The power supply as recited in claim 15 wherein an input voltage of said boost converter is unipolar.

19. The power supply as recited in claim 15 wherein said first and second controllable switches are metal-oxide semiconductor field-effect transistors (MOSFETs).

20. The power supply as recited in claim 15 wherein said controller closes said first and second controllable switches based on a characteristic of said boost converter.

21. The power supply as recited in claim 15 wherein an input voltage of said boost converter is between about 85 and about 265 volts.

22. The power supply as recited in claim 15 further comprising a filter circuit coupled to said rectifier.

23. The power supply as recited in claim 15 wherein said controller symmetrically controls said first and second controllable switches, said rectifier comprising first and second rectifying diodes.

24. The power supply as recited in claim 22 wherein said filter circuit comprises first and second high frequency capacitors.

* * * * *